United States Patent [19]

Schneider

[11] 3,905,968
[45] Sept. 16, 1975

[54] PREPARATION OF 1,2-DICHLORO-3-AMINO PROPANE DERIVATIVES

[75] Inventor: Rupert Schneider, Riehen, Switzerland

[73] Assignee: Sandoz Ltd., Basel, Switzerland

[22] Filed: Apr. 20, 1973

[21] Appl. No.: 352,955

[30] Foreign Application Priority Data
Apr. 28, 1972 Switzerland.................. 6441/72

[52] U.S. Cl. ........ 260/247; 260/293.51; 260/326.8; 260/583 G
[51] Int. Cl.² .............. C07D 295/06; C07C 87/127; C07C 17/16
[58] Field of Search........... 260/247, 293.51, 583 G, 260/326.8

[56] References Cited
UNITED STATES PATENTS

| | | | |
|---|---|---|---|
| 2,072,348 | 3/1937 | Ward .............................. | 260/583 G |
| 2,163,181 | 6/1939 | Ulrich et al...................... | 260/583 G |
| 2,987,547 | 6/1961 | Mahan ............................ | 260/570.5 |

FOREIGN PATENTS OR APPLICATIONS

| | | | |
|---|---|---|---|
| 1,015,220 | 12/1965 | United Kingdom............. | 260/583 G |
| 36-3962 | 4/1961 | Japan | |

OTHER PUBLICATIONS

Tarasenko et al., "Zh. Obshch, Khim," 34 (3), pp. 1009–10014 (1964).

March, "Advanced Organic Chemistry: Reactions, Mechanisms, and Structure," (1968), pp. 553 & 343.

*Primary Examiner*—Lorraine A. Weinberger
*Assistant Examiner*—Michael Shippen
*Attorney, Agent, or Firm*—Gerald D. Sharkin; Richard E. Vila

[57] ABSTRACT

The present invention concerns a novel process for the production of 1,2-dichloro-3-amino-propane derivatives of the formula,

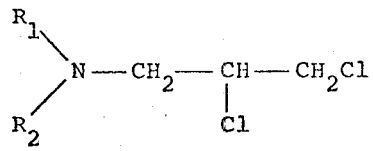

wherein $R_1$ and $R_2$ are each alkyl or, together with the nitrogen atom to which they are bound, form a heterocyclic ring, which derivatives are useful as intermediates in the production of inter alia useful insecticides.

4 Claims, No Drawings

PREPARATION OF 1,2-DICHLORO-3-AMINO PROPANE DERIVATIVES

The present invention relates to alkylamino derivatives and specifically to 1,2-dichloro-3-aminopropane derivatives of formula I,

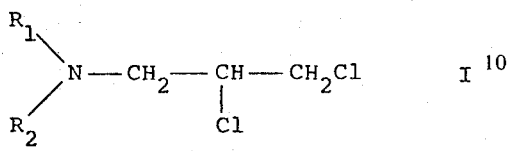

wherein $R_1$ and $R_2$, which are the same or different, are each alkyl of one to four carbon atoms, or both of $R_1$ and $R_2$, together with the nitrogen atom to which they are bound, form a five or six membered heterocyclic ring, e.g. morpholino, piperidino and pyrrolidino, in free base or acid addition salt form. When $R_1$ and $R_2$ are each alkyl, this is preferably alkyl of one to three carbon atoms, especially methyl and ethyl.

The present invention provides a process for the production of a compound of formula I which comprises chlorinating a compound of formula II,

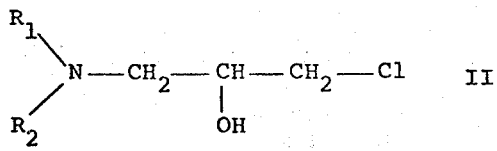

wherein $R_1$ and $R_2$ are as defined above,
with a chlorinating agent of formula III,

wherein Y is

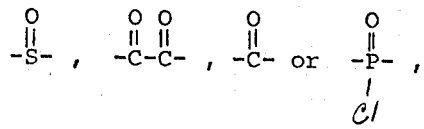

preferably

The process may be effected as follows viz:

A compound of formula III, preferably thionyl chloride, is added, conveniently whilst stirring, to a compound of formula II. The compound of formula II is preferably dissolved in an inert solvent such as acetonitrile or chloroform. The addition is conveniently effected whilst cooling to below 25°C, e.g. between 20° and 25°C. Towards the end of the addition, precipitation occurs. The precipitate is thought to be the hydrochloride of the ester of the compound of formula II. The reaction mixture is heated to decompose the precipitate, to below 85°C, e.g. between 70° and 80°C, preferably about 75°C, for up to several hours, e.g. 2½ hours, to obtain the hydrochloride of the compound of formula I. Working up may be effected in conventional manner.

Free base forms may be produced from acid addition salt forms in manner known per se and vice versa.

The starting material of formula II is preferably obtained by reacting a compound of formula IV,

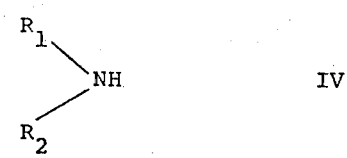

wherein $R_1$ and $R_2$ are as defined above,
with epichlorohydrin.

The reaction may be effected as follows viz:

A compound of formula IV is added to epichlorohydrin conveniently whilst stirring and cooling, e.g. to a temperature below 35°C, over the course of up to several hours, e.g. 1 hour.

The epichlorohydrin may be dissolved in an appropriate solvent such as acetonitrile or acetone. The reaction mixture is conveniently further stirred for up to several hours, e.g. up to 4 hours, after the addition, conveniently whilst cooling to below 30°C, e.g. to between 25° and 30°C.

Some of the compounds of formula II are unstable and are therefore preferably not isolated before use in the production of compounds of formula I. Preferably, therefore, the compounds of formula II are produced in situ in the production of the compounds of formula I, the resulting mixture containing the compound of formula II being dissolved in an appropriate solvent where necessary, e.g. acetonitrile or chloroform, before the direct addition of the compound of formula III.

The compounds of formula I are crystalline compounds in acid addition salt form. In some cases, said crystalline compounds are very hygroscopic so that accurate melting point determination may not be possible.

The compounds of formula I are known. They are useful as intermediates in the production of useful final compounds, e.g. in the production of final compounds having insecticidal properties.

Thus the compounds of formula I may be employed as intermediates in simple chloro substitution reactions, e.g. in the production of compounds of formula V,

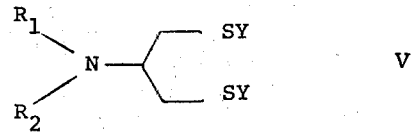

wherein
$R_1$ and $R_2$ are as defined above, and
Y is a radical $R_2SO_2-$ or a radical $-SO_3M$
wherein $R_3$ is alkyl of one to four carbon atoms or phenyl and
M is an alkali metal, preferably sodium,
by condensing a compound of formula I with one equivalent of a compound of formula VI,

MSY                                     VI wherein M and Y are as defined above,
the resulting compound of formula V possessing insecticidal properties.

Alternatively, the compounds of formula I may be used as intermediates in substitution reactions involving cyclisation, e.g. in the production of compounds of formula VII,

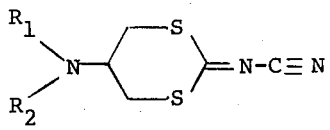

VII wherein $R_1$ and $R_2$ are as defined above,
by condensing a compound of formula I with an equivalent amount of a compound of formula VIII,

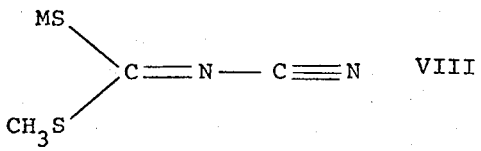

VIII wherein M is as defined above, preferably potassium, the resulting compound of formula VII possessing insecticidal properties.

Whilst the compounds of formula I are in general known, their production hitherto has been accompanied by difficulties. The present process enables the compounds to be produced in a comparatively simple and economically visible manner, resulting in compounds having a high degree of purity.

The present process also possesses flexibility in that a wide range of variation for the groups $R_1$ and $R_2$ is permitted.

The following Examples illustrate the invention, but in no way limit the scope thereof. The temperatures are indicated in degrees Centigrade.

EXAMPLE 1

Production of the 1,2-dichloro-3-dimethylaminopropane (hydrochloride form)

Into 185 g (2.0 mols) of epichlorohydrin, dissolved in 500 cc of acetonitrile, is passed, while stirring vigorously and cooling with ice-water, 90 g (2 mols) of gaseous dimethylamine at such rate that substantially no dimethylamine escapes and the reaction temperature is between 20° and 25°. After the addition, the reaction mixture is stirred for 2 further hours while cooling slightly to 20°–25°, and 298 g (2.5 mols) of thionyl chloride are added dropwise while cooling with ice-water to 20°–25°. Before the addition is completed, large quantities of a crystalline precipitate (thought to be the hydrochloride of the chlorosulphonic acid ester) are obtained. After the dropwise addition of the total amount of thionyl chloride, the crystalline precipitated slurry is heated to 75° without isolation and while stirring. The consistency becomes increasingly more liquid until the crystals are completely dissolved, SO₂ being released. The reaction mixture is kept at 75° for a further 2½ hours and then cooled to approximately 15°.

The precipitated 1,2-dichloro-3-dimethylaminopropanehydrochloride is suction filtered and washed twice with 75 cc of a mixture of benzene/acetonitrile (1:1). After drying in a vacuum at 50°, the product is analytically pure. The product consists of colourless crystals having a M.P. of 168°.

| Analysis: | $C_3H_{11}Cl_2N.HCl$ | | Molecular weight: 192.5 | |
|---|---|---|---|---|
| Calc. | C 31.2 % | H 6.2 % | Cl 55.4 % | N 7.3 % |
| Found | 31.4 % | 6.4 % | 55.3 % | 7.4 % |

EXAMPLE 2

Production of the 1,2-dichloro-3-N-morpholino-propane (hydrochloride form)

87 g (1.0 mol) of morpholine are added dropwise, while cooling with ice-water and stirring vigorously, at 25°–30°, over the course of 1 hour, to 92.5 g (1.0 mol) of epichlorohydrin. After the dropwise addition, the mixture is stirred for 4 further hours at 25°–30°, while cooling slightly from time to time. Then the mixture is taken up in 400 cc of acetonitrile and 150 g (1.26 mol) of thionyl chloride are added dropwise at 20°–25° while cooling with ice-water. Before the addition is completed, large quantities of a precipitate are obtained. After the dropwise addition of the total amount of thionyl chloride, the slurry is heated to 75° while stirring; SO₂ escapes and the crystalline substance is dissolved completely. The reaction mixture is kept at 75°for a further 2½ hour period and then cooled to room temperature. The solvent together with the excess thionyl chloride is removed from the reaction mixture at 50° in a vacuum. The solid residue is dissolved with 300 cc of isopropyl alcohol at 50° and then cooled in an ice bath over the course of 1 hour, upon which the 1,2-dichloro-3-N-morpholino-propane-hydrochloride crystallizes. After suction filtration the compound is washed with 50 cc of isopropyl alcohol. After drying at 50°, the product is analytically pure. The product consists of colourless crystals having a M.P. of 138°–139°.

| Analysis: | $C_7H_{13}Cl_2NO.HCl$ | | Molecular weight: 234.5 | |
|---|---|---|---|---|
| Calc. | C 35.8 % | H 6.0 % | Cl 45.4 % | N 6.0 % |
| Found | 35.5 % | 6.1 % | 45.2 % | 6.0 % |

The following compounds of general formula I are produced in analogous manner to that described in Example 2.

EXAMPLE 3

1,2-Dichloro-3-N-piperidino-propane (hydrochloride form)

Colourless crystals having a M.P. of 178°.

| Analysis: | $C_8H_{15}Cl_2N.HCl$ | | Molecular weight: 232.5 | |
|---|---|---|---|---|
| Calc. | C 41.3 % | H 6.9 % | Cl 45.8 % | N 6.0 % |
| Found | 41.4 % | 7.1 % | 45.5 % | 6.0 % |

EXAMPLE 4

1,2-Dichloro-3-N-pirrolidino-propane (hydrochloride form)

The substance is highly hygroscopic. Thus, melting point and analyses cannot reliably be determined.

EXAMPLE 5

Examples 1 to 4 are repeated employing respectively oxalyl chloride, phosgene and phosphorous oxychloride instead of thionyl chloride in each case, to produce the title compounds of Examples 1 to 4.

What is claimed is:

1. The process for producing a 1,2-dichloro-3-aminopropane derivative in hydrochloride acid addition salt form and of the formula:

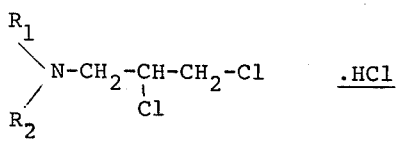

wherein each of $R_1$ and $R_2$ is independently alkyl of one to four carbon atoms or when taken together with the nitrogen atom to which they are bound form a five or six membered heterocyclic ring, which process comprises reacting a 1-chloro-2-hydroxy-3-amino-propane derivative of the formula:

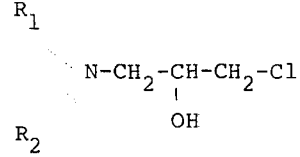

wherein $R_1$ and $R_2$ are as defined above, with thionyl chloride at a temperature below 25°C. in an inert solvent for a time sufficient to obtain a precipitate of a first reaction product, and heating said precipitate in an inert solvent at a temperature sufficient to decompose said precipitate but below 85°C. to obtain said 1,2-dichloro-3-amino-propane derivative.

2. The process of claim 1 wherein the precipitate is heated to a temperature between 70 and 80°C.

3. The process of claim 1 wherein $R_1$ and $R_2$ are the same or different and are each alkyl of one to four carbon atoms, or both of $R_1$ and $R_2$ together with the nitrogen atom to which they are bound, are morpholino, piperidino or pyrrolidino.

4. The process of claim 1 in which the inert solvent is selected from the group consisting of acetonitrile and chloroform.

* * * * *